United States Patent [19]

Billings

[11] 4,067,134

[45] Jan. 10, 1978

[54] FISHING LINE HOLDER

[76] Inventor: Maurice A. Billings, P.O. Box 533, Kimberling City, Mo. 65686

[21] Appl. No.: 732,006

[22] Filed: Oct. 13, 1976

[51] Int. Cl.² ............................................. A01K 97/06
[52] U.S. Cl. .................................. 43/25.2; 43/57.5 R; 24/84 R
[58] Field of Search ...................... 43/25, 25.2, 57.5 R, 43/54.5 R, 43.12; 24/84 R, 84 A, 84 B, 67.5, 252 R, 236, 237, 137 A; 339/228

[56] References Cited

U.S. PATENT DOCUMENTS

| 2,715,292 | 8/1955 | Williams | 43/25.2 |
| 3,251,104 | 5/1966 | Sylvester | 24/84 R |
| 3,281,981 | 11/1966 | Dykhouse | 43/25.2 |

Primary Examiner—Warner H. Camp

[57] ABSTRACT

A spring snap is swivally connected to a guide on a fishing rod. A pair of reverse-acting clamping jaws has intermediate portions biased away from each other by a coil spring mounted therebetween are pivotably connected to the snap at one end and have a second terminal end clamping a lure, hook, or the like tied on an end of a line on the fishing rod therebetween to prevent the line from tangling when transporting the rod.

7 Claims, 1 Drawing Figure

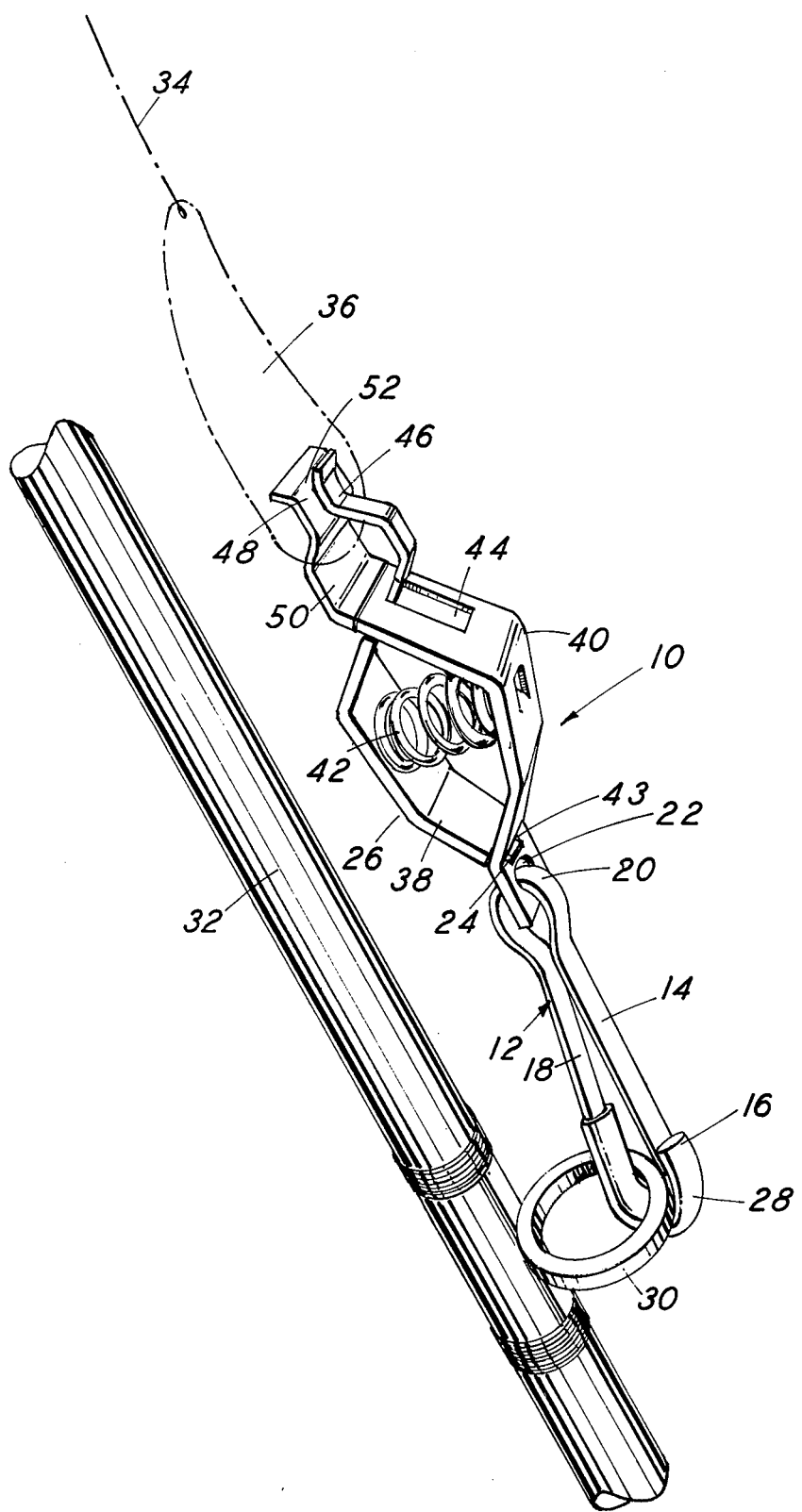

FISHING LINE HOLDER

BACKGROUND OF THE INVENTION

This invention relates to a device for clamping a hook or the like tied on the end of a fishing line to an eyelet on a fishing rod.

When transporting a fishing rod to and from a fishing location, it is often inconvenient to remove the hook or lure tied to the end of the line and retie the hook or lure at the location. If the hook were to swing free, this creates a potential hazard of tangling the end of the line and/or hooking the clothing or a passerby or an inanimate object. In order to overcome this problem, fishermen often position the hook on an eyelet of the rod and draw the line taut. However, the eyelet or hook is often bent, clipped or weakened by this procedure. Accordingly, this invention provides a clamp swivelly mounted on an eyelet of a fishing rod for holding a hook, lure, or the like tied to the end of the fishing line while transporting the rod.

SUMMARY OF THE INVENTION

In accordance with the invention, the clamp includes a spring snap having a plastic covering swivelly mounted on an eyelet of a fishing rod. The snap rotatably mounts a reverse acting spring-biased clamp having a pair of pivotable jaws adapted to hold a hook or lure on the end of a fishing line on the rod. The interior surfaces of the jaws have a shrink plastic covering for engagement with the body of the lure so as not to chip the paint or coating on the lure or hook.

BRIEF DESCRIPTION OF THE DRAWING

Further objects and advantages of the invention will become apparent from the following description and claims and from the accompanying drawing, wherein:

The sole FIG. is a perspective view of the fishing line holder of the present invention mounted on a fishing rod.

DETAILED DESCRIPTION OF THE PREFERRED EMBODIMENT

Referring now to the drawing in detail wherein like numerals indicate like elements throughout the several views, the fishing line holder 10 of the present invention includes a spring snap 12 having a linear resilient arm 14 in abutment with the terminal end 16 a J-shaped hook portion 18. The J-shaped hook portion 18 is pivotably connected to the linear arm 14 by a semi-circular ring 20 received through a hole 22 in a tab 24 on a spring-biased, reverse acting clamp 26.

The terminal end 16 of J-shaped hook portion 18 has a plastic covering 28 in swivel contact with a guide or eyelet 30 of a fishing rod 32 having a line 34. A hook or lure 36 is tied to the end of line 34. Terminal end 16 is engaged over the guide 30 by moving arm 14 relative to terminal end 16 of J-shaped hook portion 18, inserting the guide 30 into the interior arcuate portion of terminal end 16 and releasing arm 14.

Clamp 26 includes a pair of jaws 38, 40, biased apart by a coil spring 42. One end of jaw 38 is received in a slot 43 in tab 24 and is C-shaped so as to rock or pivot relative to jaw 40. The other end of jaw 38 passes through an elongated slot 44 in jaw 40 and the ends 46, 48 of jaws 38, 40, respectively are reversely bent so as to contact each other under the urging of spring 42. The ends 46, 48 are covered by a plastic shrink coating 50 and are bent away from each other at their tips to form a passage 52 therebetween to receive the body of lure 36 to clamp it to clamp 26.

Snap 12 can be mounted on eyelet 30 and everytime it is desired to transport rod 32, the rear portion of jaws 38 and 40 are moved towards each other against the bias of spring 42 to move ends 46 and 48 away from each other to receive lure 36 therebetween. Jaws 38 and 40 are then released to clamp lure 36 between jaws 38 and 40 under the urging of spring 42.

While a specific embodiment of a fishing line holder has been disclosed in the foregoing description, it will be understood that various modifications within the spirit of the invention may occur to those skilled in the art. Therefore, it is intended that no limitations be placed on the invention except as defined by the scope of the appended claims.

I claim:

1. A fishing line holder adapted to be mounted on a guide on a fishing rod comprising:

a spring snap having a J-shaped terminal end portion pivotably connected to a substantially linear arm resiliently abutting the terminal end portion, said J-shaped terminal portion being adapted to swivelly receive a guide on a fishing rod on its interior surface which is locked thereto by said linear arm; and a reverse acting clamp pivotably connected to the juncture of said linear arm and J-shaped terminal portion of said snap swivel, said clamp including a pair of jaws having a first portion pivotably connected at one end, one of said jaws passing through a slot in the other, the other ends of said jaws defining a clamping second portion bent back towards each other to receive a lure or the like on the end of a fishing line on said rod in clamped engagement therebetween; and means between the first portion of said jaws for normally urging the first portion of said jaws away from each other and the second portion thereof towards each other.

2. The holder of claim 1 wherein said urging means is a coil spring.

3. The holder of claim 1 wherein one of said jaws of said clamp includes a rearwardly extending tab having a hole therethrough receiving the juncture of said J-shaped portion and linear arm of said snap.

4. The holder of claim 1, wherein the other ends of the jaws of said clamp are bent away from each other to form a passage therebetween.

5. The holder of claim 1, wherein the one end of one of said jaws is received in a slot in the one end of the other of said jaws.

6. The holder of claim 1, wherein the terminal portion of said J-shaped hook portion of said snap includes a plastic covering.

7. The holder of claim 1, wherein the terminal portion of said second clamping portion of each jaw includes a plastic covering.

* * * * *